US012206198B2

(12) United States Patent
Teramoto

(10) Patent No.: US 12,206,198 B2
(45) Date of Patent: Jan. 21, 2025

(54) ELECTRICAL CONNECTOR WITH FIXED FRONT MASK ON HOUSING WITH MULTIPLE TERMINALS

(71) Applicant: SUMITOMO WIRING SYSTEMS, LTD., Mie (JP)

(72) Inventor: Keisuke Teramoto, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 372 days.

(21) Appl. No.: 17/681,255

(22) Filed: Feb. 25, 2022

(65) Prior Publication Data

US 2022/0294149 A1 Sep. 15, 2022

(30) Foreign Application Priority Data

Mar. 10, 2021 (JP) ................................ 2021-037881

(51) Int. Cl.

| | |
|---|---|
| ***H01R 13/436*** | (2006.01) |
| ***H01R 13/422*** | (2006.01) |
| ***H01R 13/502*** | (2006.01) |
| ***H01R 13/627*** | (2006.01) |
| *H01R 13/40* | (2006.01) |

(52) U.S. Cl.

CPC ..... *H01R 13/4365* (2013.01); *H01R 13/4223* (2013.01); *H01R 13/436* (2013.01); *H01R 13/4361* (2013.01); *H01R 13/502* (2013.01); *H01R 13/6272* (2013.01); *H01R 13/40* (2013.01); *H01R 13/4364* (2013.01); *H01R 13/627* (2013.01); *H01R 13/6271* (2013.01)

(58) Field of Classification Search

CPC ........... H01R 13/4365; H01R 13/4223; H01R 13/436; H01R 13/4361; H01R 13/502; H01R 13/6272; H01R 13/4364; H01R 13/627; H01R 13/6271; H01R 13/40

See application file for complete search history.

(56) References Cited

U.S. PATENT DOCUMENTS

2002/0197914 A1* 12/2002 Mase ................ H01R 13/4362 439/752
2019/0252817 A1 8/2019 Kida et al.

FOREIGN PATENT DOCUMENTS

JP 2011-029052 A 2/2011

* cited by examiner

*Primary Examiner* — Justin M Kratt
(74) *Attorney, Agent, or Firm* — Venjuris, P.C.

(57) ABSTRACT

A plurality of cavities 22 of a housing 20 extend in a front-rear direction and are arranged side by side in a width direction. The housing 20 includes a recess 32, 32A open in one surface in a height direction in a partition wall 23 partitioning between the cavities 22 adjacent in the width direction. The recess 32, 32A is shaped by cutting the partition wall 23 in the width direction. A front mask 60 includes an end wall 62 projecting from a front wall 61 and to be arranged on one surface side in the height direction of the housing 20, and a projection 67, 67A projecting from the end wall 62, to be fit into the recess 32, 32A to fill up the recess 32, 32A and contactably facing a front surface of the recess 32, 32A without contacting terminal fittings 50.

4 Claims, 7 Drawing Sheets

ELECTRICAL CONNECTOR WITH FIXED FRONT MASK ON HOUSING WITH MULTIPLE TERMINALS

CROSS-REFERENCE TO RELATED APPLICATIONS

This application is based on and claims priority from Japanese Patent Application No. 2021-037881, filed on Mar. 10, 2021, with the Japan Patent Office, the disclosure of which is incorporated herein in their entireties by reference.

TECHNICAL FIELD

The present disclosure relates to a connector.

BACKGROUND

A connector described in Japanese Patent Laid-open Publication No. 2011-029052 includes a female housing, a front mask to be mounted into a mounting recess on a front surface side of the female housing from below, and female terminals to be inserted into cavities of the female housing from behind. The front mask includes a front wall to be fit into the mounting recess. The female terminals are inserted into the cavities and stopped in contact with the front wall.

Further, the front mask includes an installation portion extending in a width direction behind the front wall. The female housing includes a locking recess open in a lower surface. The installation portion enters the locking recess from below, whereby the front mask is arranged with a movement in a front-rear direction with respect to the female housing restricted. Japanese Patent Laid-open Publication No. 2019-140046 discloses the arrangement of a front retainer on a front surface side of a housing.

SUMMARY

In the case of Japanese Patent Laid-open Publication No. 2011-029052, when the female terminal is stopped in contact with the front wall, a forward positional displacement of the front wall can be prevented by the locking of the installation portion and the locking recess. However, the locking recess of the female housing has a wide dedicated shape to be able to receive the installation portion. Thus, there has been a concern for the enlargement and complication of the female housing.

Accordingly, the present disclosure aims to provide a connector capable of preventing a forward positional displacement of a front mask while suppressing the enlargement and complication of a housing.

The present disclosure is directed to a connector with a housing including cavities, terminal fittings to be accommodated into the cavities, and a front mask including a front wall to be arranged on a front surface side of the housing, wherein a plurality of the cavities extend in a front-rear direction and are arranged side by side in a width direction, the housing includes a recess open in one surface in a height direction intersecting the front-rear direction and the width direction in a partition wall partitioning between the cavities adjacent in the width direction, the recess is shaped by cutting the partition wall in the width direction, and the front mask includes an end wall projecting from the front wall and to be arranged on one surface side in the height direction of the housing and a projection projecting from the end wall, to be fit into the recess to fill up the recess and contactably facing a front surface of the recess without contacting the terminal fittings.

According to the present disclosure, it is possible to provide a connector capable of preventing a forward positional displacement of a front mask while suppressing the enlargement and complication of a housing.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
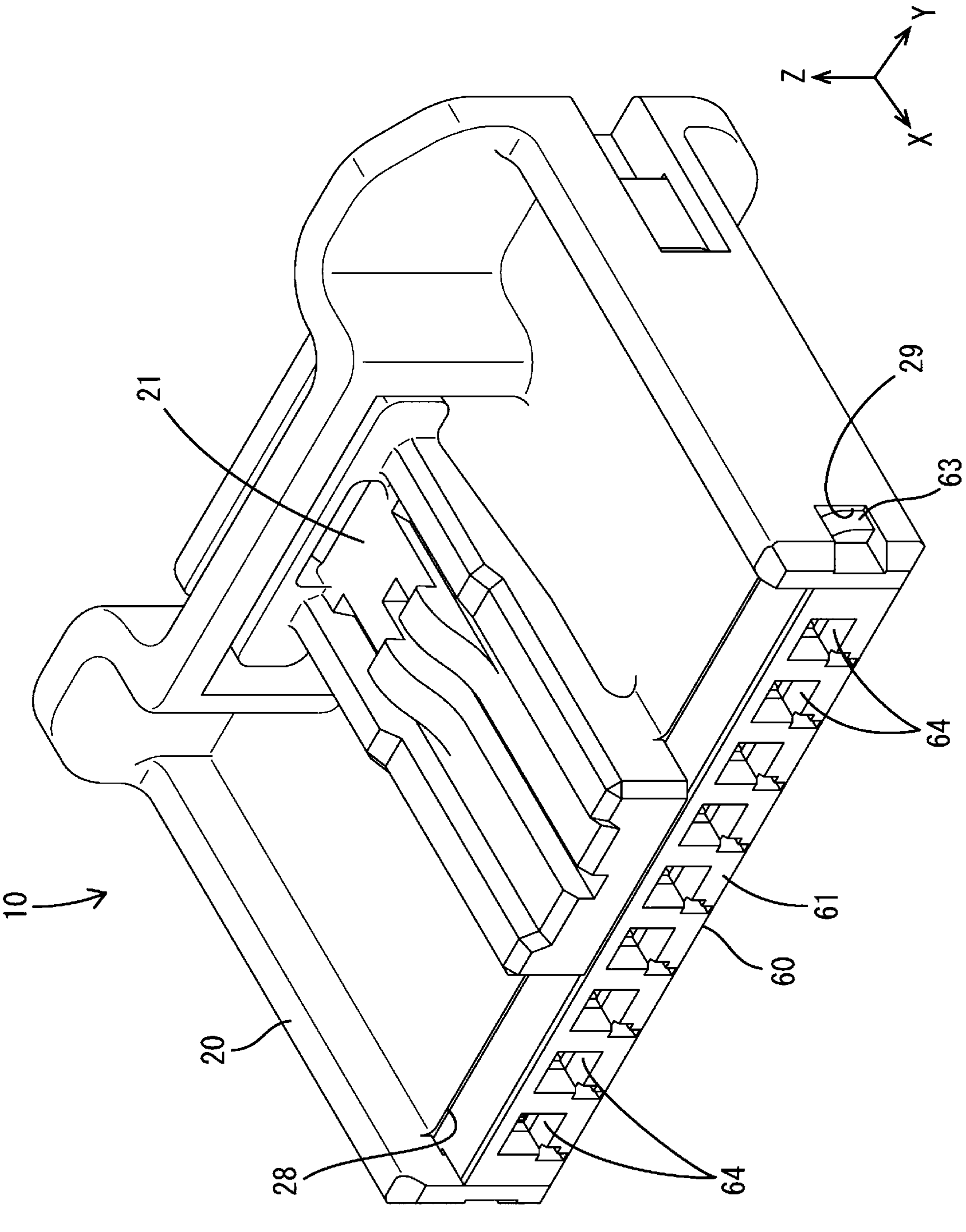
FIG. 1 is a perspective view of a connector according to a first embodiment when viewed obliquely from an upper-front side.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

DESCRIPTION OF EMBODIMENTS OF PRESENT DISCLOSURE

First, embodiments of the present disclosure are listed and described.

(1) The connector of the present disclosure is provided with a housing including cavities, terminal fittings to be accommodated into the cavities, and a front mask including a front wall to be arranged on a front surface side of the housing, wherein a plurality of the cavities extend in a front-rear direction and are arranged side by side in a width direction, the housing includes a recess open in one surface in a height direction intersecting the front-rear direction and the width direction in a partition wall partitioning between the cavities adjacent in the width direction, the recess is shaped by cutting the partition wall in the width direction, and the front mask includes an end wall projecting from the front wall and to be arranged on one surface side in the height direction of the housing and a projection projecting from the end wall, to be fit into the recess to fill up the recess and contactably facing a front surface of the recess without contacting the terminal fittings.

According to the above configuration, even if the front wall is pushed forward such as when the terminal fitting is stopped in contact with the front wall, the projection contacts the front surface of the recess, whereby a forward positional displacement of the front wall can be prevented. Particularly, since the recess is provided effectively utilizing the partition wall partitioning between the cavities in the case of the above configuration, the enlargement and complication of the housing can be suppressed. Further, since the projection is fit into the recess to fill up the recess, a part cut by forming the recess can be compensated by the projection. Furthermore, since the projection does not contact the terminal fittings and the tip of the projection needs not be pulled up to a height position where the projection can contact the terminal fittings, a height (recessed amount) of the recess can be suppressed small.

(2) Preferably, the projection is in the form of a rectangular column projecting from the end wall. According to this, the projection can have a simple shape and the rigidity of the projection can be enhanced.

(3) Preferably, the housing includes deflectable and deformable locking lances projecting into the cavities and configured to lock the terminal fittings, the locking lance includes an engaging recess open in at least one side surface, out of side surfaces on both sides in the width direction, and the projection includes an engaging projection projecting from the partition wall, to be fit into the engaging recess and contactably facing a front surface of the engaging recess.

According to the above configuration, when a pull-out force is applied to the terminal fitting to pull out the terminal fitting rearward from the cavity, the engaging projection can contact the front surface of the engaging recess. Thus, the pull-out force can be resisted and a holding force of the locking lance to hold the terminal fitting can be enhanced.

(4) Preferably, clearances for allowing deflection of the locking lance are present between the engaging projection and front and rear surfaces of the engaging recess in the engaging recess. According to this, the terminal fitting can be inserted into the cavity to deflect and deform the locking lance with the engaging projection fit in the engaging recess.

DETAILS OF EMBODIMENT OF PRESENT DISCLOSURE

Specific examples of embodiments of the present disclosure are described below with reference to the drawings. Note that the present invention is not limited to this illustration and is intended to be represented by claims and include all changes in the scope of claims and in the meaning and scope of equivalents.

First Embodiment

Figure 2:
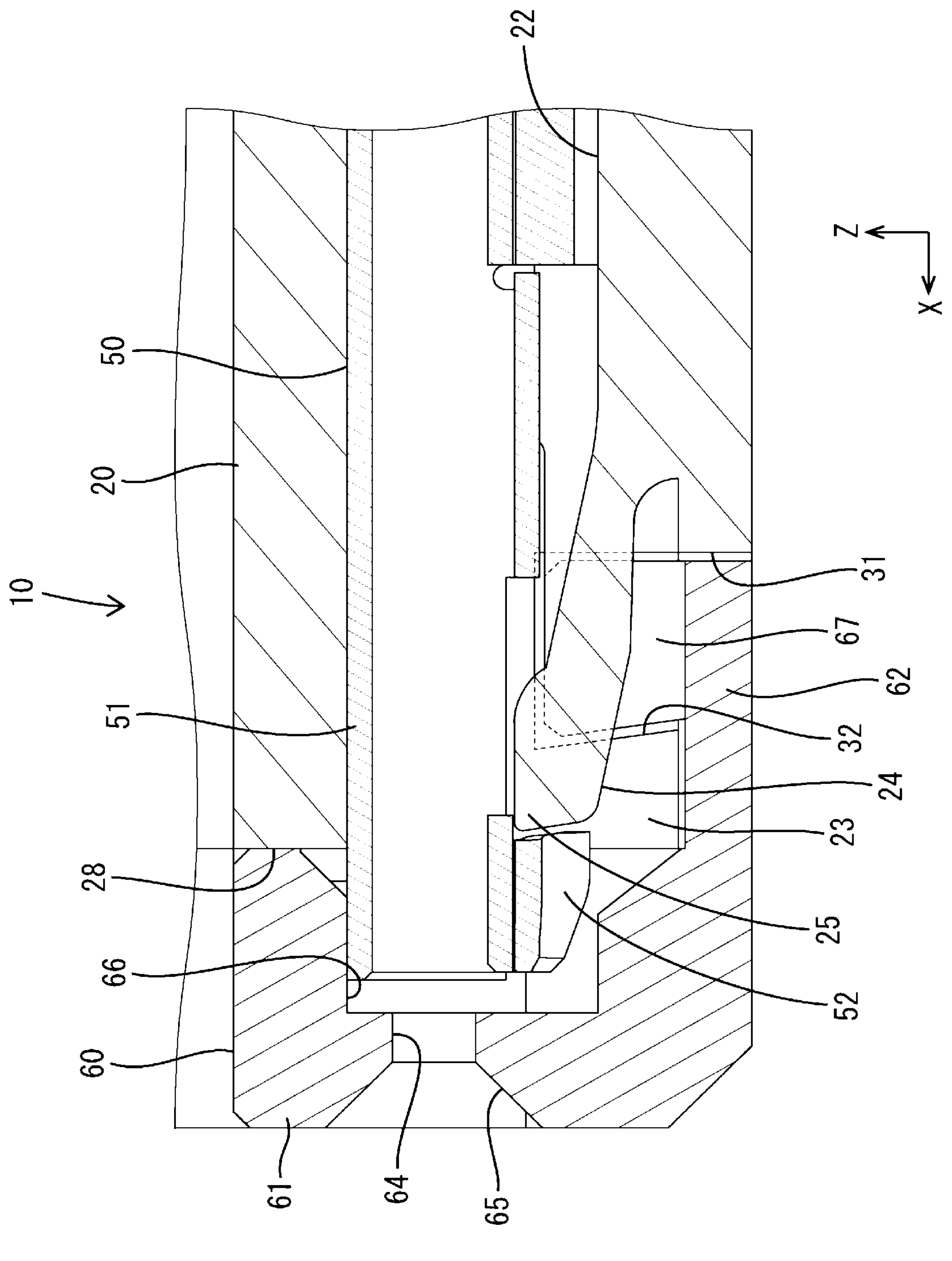
FIG. 2 is an enlarged side view in section of a front part of the connector.

A connector 10 according to a first embodiment includes a housing 20, terminal fittings 50 and a front mask 60 as shown in FIG. 2. The connector 10 is connectable to an unillustrated mating connector. The terminal fittings 50 are accommodated in the housing 20. The front mask 60 is assembled with the housing 20. Note that, in the following description, a surface side of the connector 10 facing the mating connector when the connection of the connector 10 is started is referred to as a front side concerning a front-rear direction. The front side is also a side where the front mask 60 is located with respect to the housing 20. An X direction in FIGS. 1 and 2 is a forward direction. A leading end side in an assembling direction when the front mask 60 is assembled with the housing 20 is referred to as an upper side concerning a vertical direction. A Z direction in FIGS. 1 and 2 is an upward direction. The vertical direction is a synonymous with a height direction. A Y direction in FIG. 1 is referred to as a rightward direction concerning a lateral direction. The lateral direction is synonymous with a width direction. The respective directions are directions for the convenience of description and do not limit directions when the connector 10 is assembled and used.

The terminal fitting 50 is made of conductive metal and, although not entirely shown, is shaped to extend long in the front-rear direction. As shown in FIG. 2, a tubular body portion 51 is provided in a front part of the terminal fitting 50. A male tab of an unillustrated mating terminal is inserted into the body portion 51 from front to be connected. The body portion 51 is provided with a locked portion 52 projecting downward. The terminal fitting 50 is crimped and connected to an end part of an unillustrated wire.

Figure 5:
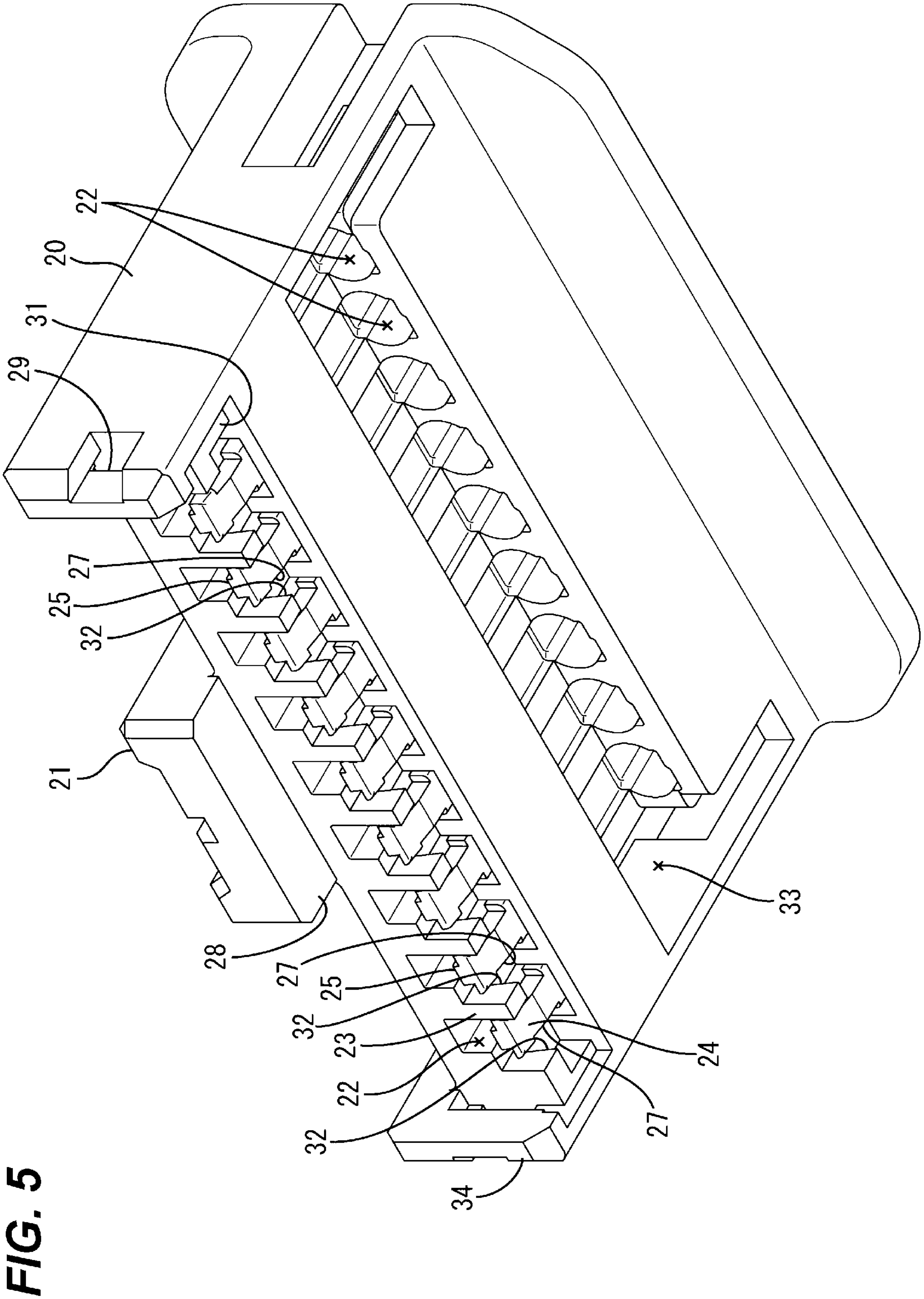
FIG. 5 is a perspective view of a housing when viewed obliquely from a lower-front side.

The housing 20 is made of synthetic resin and has a flat shape with a small height as shown in FIGS. 1 and 5. A lock arm 21 is provided on the upper surface of the housing 20. The lock arm 21 is deflectable and deformable with a front end part as a fulcrum. The lock arm 21 locks the mating connector and holds the connector 10 and the mating connector in a connected state.

Figure 3:
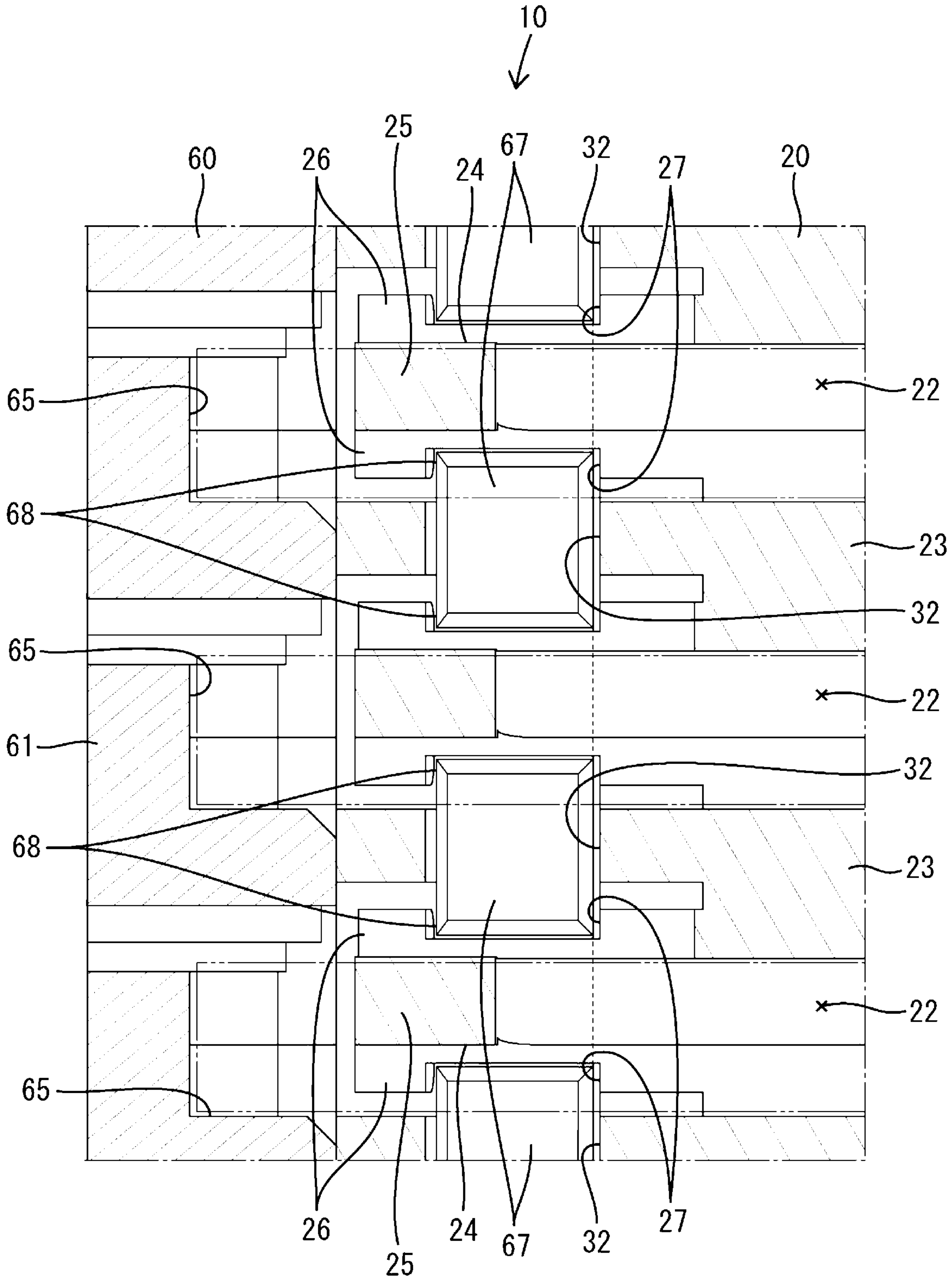
FIG. 3 is an enlarged plan view in section of the front part of the connector.

As shown in FIG. 3, the housing 20 includes a plurality of cavities 22. The respective cavities 22 extend in the front-rear direction and are arranged side by side in a row in the width direction in the housing 20. The terminal fittings 50 are inserted into the cavities 22 from behind. The cavities 22 adjacent in the width direction are partitioned by partition walls 23.

The housing 20 includes a locking lance 24 in each cavity 22. As shown in FIG. 2, the locking lance 24 is shaped to project forward from the lower surface of the inner wall of the cavity 22 and deflectable and deformable in the vertical direction. The locking lance 24 includes a locking projection 25 in a laterally central part of a front end part. Further, as shown in FIG. 3, the locking lance 24 has guide surfaces 26 on both left and right sides across the locking projection 25 in the front end part. The guide surfaces 26 are inclined downward toward the front (see FIG. 4).

The terminal fitting 50 is inserted into the cavity 22. As shown in FIG. 2, the locked portion 52 of the body portion 51 is locked by the locking projection 25 of the locking lance 24, whereby the terminal fitting 50 is retained in the cavity 22. Further, the locking of the terminal fitting 50 and the locking lance 24 is released by bringing an unillustrated unlocking jig into contact with the guide surfaces 26 to deflect and deform the locking lance 24.

Figure 4:
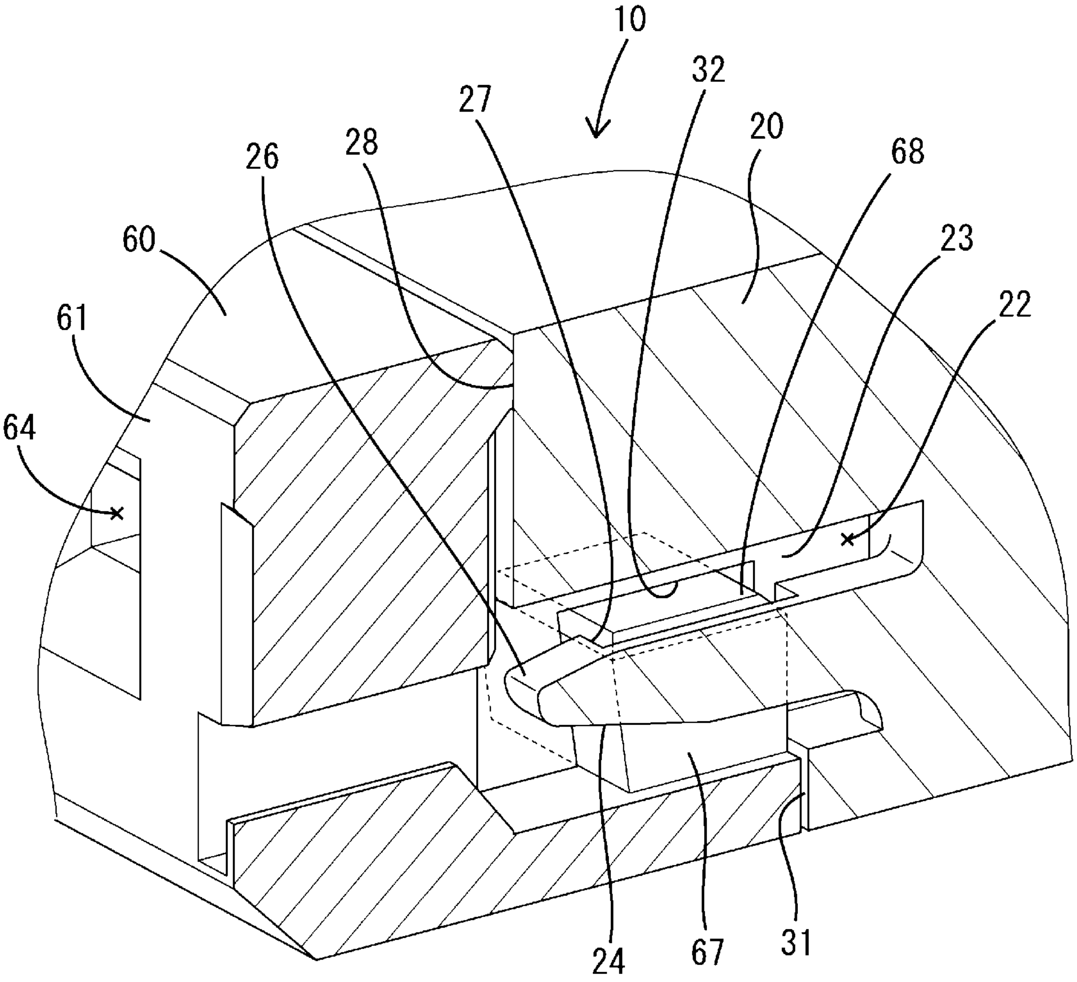
FIG. 4 is a partial enlarged view partly in section showing a state where a projection is fit to a recess and an engaging recess.

The locking lance 24 includes engaging recesses 27 respectively open in end surfaces on both left and right sides (side surfaces). The engaging recesses 27 penetrate through the locking lance 24 in the vertical direction. The front surface of the engaging recess 27 is inclined forward from a lower end toward an upper end. The rear surface of the engaging recess 27 is arranged along the vertical direction. As shown in FIG. 4, the engaging recess 27 is arranged behind the guide surface 26.

As shown in FIG. 5, a mounting recess 28 is provided in a front part of the housing 20. The mounting recess 28 is shaped to be recessed while leaving both left and right end parts and a front end part of the lock arm 21 in the front part of the housing 20. The front end of each cavity 22 is open in the rear surface (back surface) of the mounting recess 28. The front mask 60 is fit into the mounting recess 28 of the housing 20 from below. Further, the front part of the housing 20 includes lock holes 29 penetrating in the lateral direction in both left and right end parts.

As shown in FIG. 5, a lower surface mounting recess 31 is provided behind and continuously with the mounting recess 28 in the front part of the housing 20. The lower surface mounting recess 31 is shaped to be recessed in the lower surface of the front end part of the housing 20. The lower end of a front part of each partition wall 23 is exposed to the lower surface of the housing 20 via the lower surface mounting recess 31.

A recess 32 is provided in the front end part of each partition wall 23. The recess 32 is cut to penetrate through the partition wall 23 in the lateral direction. As shown in FIG. 3, the recess 32 faces and communicates with the engaging recesses 27 in the lateral direction. Further, as shown in FIG. 2, the recess 32 extends in the vertical direction, the lower end (opening end) thereof is open in the lower end of the partition wall 23 and the upper end (back end) thereof is closed inside the partition wall 23. The front surface of the recess 32 is inclined forward from a lower end to an upper end. The rear surface of the recess 32 is arranged along the lateral direction and the vertical direction and connected to the rear surface of the lower surface mounting recess 31 without any step. Note that a side wall 34 on one end side (left end side of FIG. 5), out of both left and right sides of the housing 20, is not the partition wall 23, but includes the recess 32 as shown in FIG. 5.

As shown in FIG. 5, a retainer mounting hole 33 is provided to be open in the lower surface of the housing 20. An unillustrated retainer is inserted into the retainer mounting hole 33. To form the retainer mounting hole 33, intermediate parts in the front-rear direction of the respective partition walls 33 of the housing 20 are cut. Note that the retainer secondarily retains the terminal fittings 50, following the locking lances 24.

Figure 6:
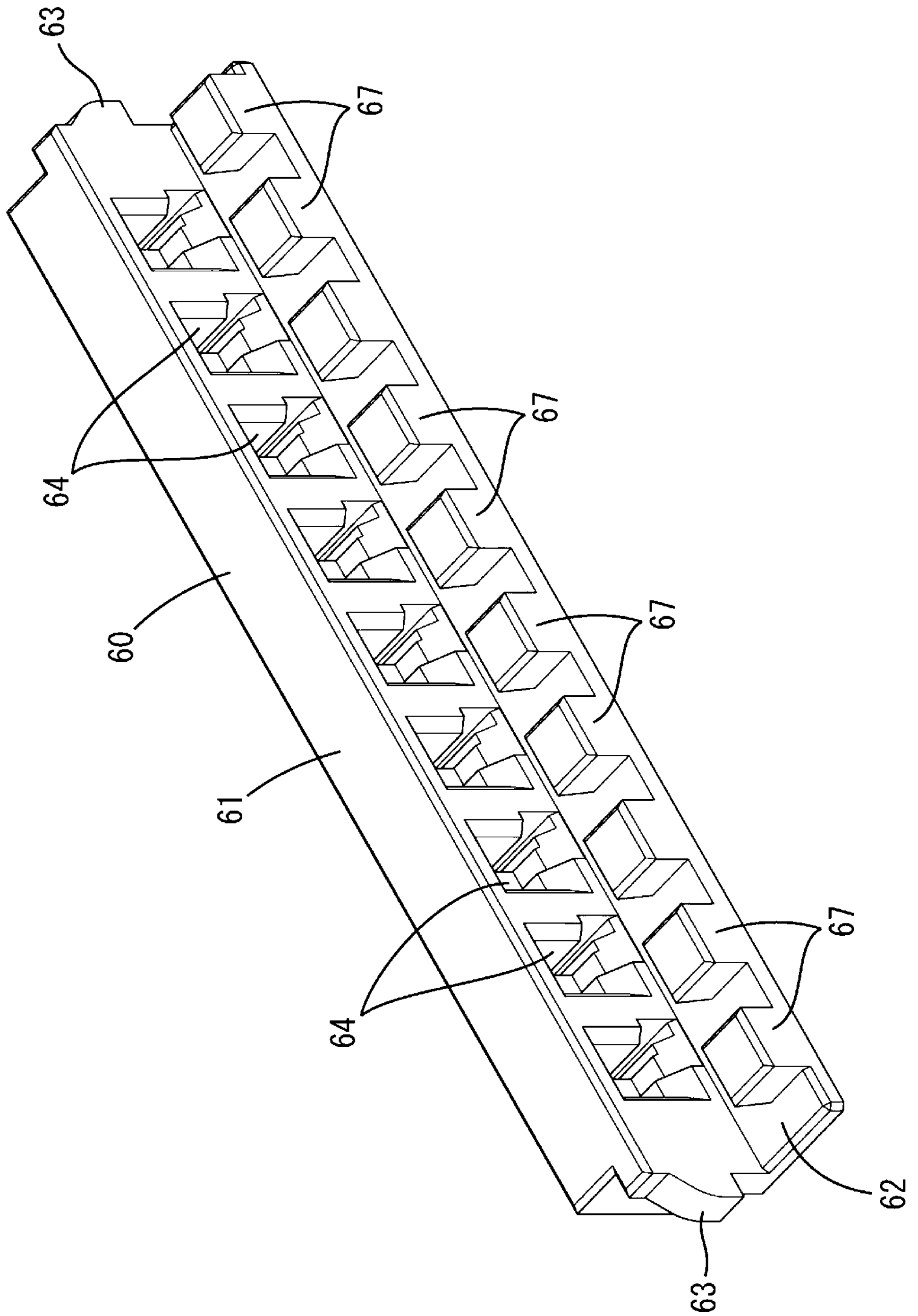
FIG. 6 is a perspective view of a front mask when viewed obliquely from an upper-rear side.

The front mask 60 is made of synthetic resin and includes, as shown in FIG. 6, a front wall 61 extending long in the lateral direction and an end wall 62 projecting rearward from a lower end part of the front wall 61. The end wall 62 also extends long in the lateral direction and is coupled to the lower end part of the front wall 61 over the entire width.

As shown in FIGS. 1 and 2, the front wall 61 is fit into the mounting recess 28. As shown in FIG. 6, claw-like lock projections 63 are provided to project on end surfaces on both left and right sides (side surfaces) of the front wall 61. The front wall 61 includes a plurality of tab insertion holes 64. The respective tab insertion holes 64 are arranged side by side in a row in the width direction at positions corresponding to the respective cavities 22.

As shown in FIG. 2, a guiding portion 65 widened toward the front is provided in a front end part of the tab insertion hole 64. The male tab of the unillustrated mating terminal is guided into the cavity 22 by the guiding portion 65. A fitting recess 66 having a rectangular cross-section is provided in a rear part of the tab insertion hole 64. As shown in FIG. 3, a front end part of the body portion 51 of the terminal fitting 50 is fit into the fitting recess 66. The body portion 51 is stopped in contact with the front surface of the fitting recess 66 in the tab insertion hole 64.

The end wall 62 is plate-like and arranged with plate surfaces (wall surfaces) facing upward and downward. The end wall 62 is deflectably and deformably coupled to the lower end part of the front wall 61 and, as shown in FIG. 2, fit into the lower surface mounting recess 31. A plurality of projections 67 are provided to project on the upper surface of the end wall 62. The respective projections 67 are arranged side by side in a row in the width direction at positions corresponding to the respective recesses 32 on the upper surface of the end wall 62. The respective projections 67 are arranged behind and away from the front wall 61.

The projection 67 is in the form of a flat rectangular column having a small height. Further, the projection 67 is formed to have a constant rectangular cross-sectional shape, in particular, a square cross-sectional shape from a lower end integrally connected to the end wall 62 to an upper end. The rear surface of the projection 67 is arranged along the lateral direction and the vertical direction and connected to the rear surface of the end wall 62 without any step. As shown in FIG. 2, the front surface of the projection 67 is inclined forward from a lower end toward an upper end.

Next, an assembling method and functions of the connector 10 according to the first embodiment are described. The front mask 60 is assembled with the housing 20 from below. As shown in FIG. 1, the front wall 61 is fit into the mounting recess 28 and the lock projections 63 are fit into the lock holes 29, whereby the front mask 60 is retained and held on the housing 20. At this time, the end wall 62 is fit into the lower surface mounting recess 31 and, as shown in FIG. 3, laterally central parts of the projections 67 are fit into the recesses 32 and both left and right parts (called engaging projections 68) of the projections 67 are fit into the engaging recesses 27. In short, the projection 67 is fit to the recess 32 and the engaging recesses 27. The projection 67 has a cross-sectional shape similar to and fittable to the recess 32 and the engaging recesses 27. Thus, the projection 67 is arranged to fill up the recess 32 and the engaging recesses 27 from open sides of the recess 32 and the engaging recesses 27 (see FIGS. 2 to 4).

As shown in FIG. 2, the front surface of the laterally central part of the projection 67 and the front surface of the recess 32 are arranged to contactably face each other over the entire height of the projection 67. Similarly, the front surfaces of the engaging projections 68 and the front surfaces of the engaging recesses 27 are arranged to contactably face each other over the entire height of the projection 67.

After the front mask 60 is assembled with the housing 20, the terminal fittings 50 are inserted into the cavities 22 of the housing 20 from behind. The end parts of the wires are connected to the terminal fittings 50 in advance.

In the process of inserting the terminal fitting 50, the body portion 51 interferes with the locking projection 25 from behind and the locking lance 24 is deflected and deformed downward. Tiny clearances are present between the engaging projections 68 and the front and rear surfaces of the engaging recesses 27 in the engaging recesses 27 (see FIG. 2). Thus, the locking lance 24 can be deflected and deformed within ranges of clearances between the front and rear surfaces of the engaging recesses 27 and the engaging projections 68. Since the front and rear surfaces of the engaging recesses 27 are inclined in a direction along a deflection direction of the locking lance 24, the above clearances do not become particularly large.

When the terminal fitting 50 is properly inserted into the cavity 22, the body portion 51 is stopped in contact with the front wall 61, the locking lance 24 resiliently returns and the locking projection 25 locks the locked portion 52. In this way, the terminal fitting 50 is held in the cavity 22 with a movement in the front-rear direction restricted (see FIG. 2). Note that the projection 67 is entirely located below the terminal fitting 50 and arranged outside an insertion path for the terminal fitting 50 in the cavity 22. Thus, the projection 67 does not contact the terminal fitting 50.

As the body portion 51 is stopped in contact with the front wall 61, a pressing force to displace the front wall 61 forward is applied to the front wall 61. Particularly, since the front wall 61 is long in the lateral direction, the front wall 61 is easily deformed if a large pressing force is applied to a laterally central part of the front wall 61.

However, in the case of the first embodiment, the front surface of the projection 67 contacts the front surface of the recess 32, whereby the pressing force can be resisted and a forward positional displacement of the front wall 61 can be prevented. Moreover, a plurality of the projections 67 are arranged side by side in the width direction including the position corresponding to the laterally central part of the front wall 61 and each projection 67 is fit into the corresponding recess 32. Thus, the deformation of the front wall 61 can be effectively suppressed.

Further, if the wire pulled out rearward from the housing 20 is pulled rearward, a pull-out force to displace the terminal fitting 50 rearward is applied to this terminal fitting 50. In this case, the pull-out force can be resisted by the front surfaces of the engaging projections 68 contacting the front surfaces of the engaging recesses 27 in the case of the first embodiment. In short, a holding force of the locking lance 24 to hold the terminal fitting 50 can be enhanced.

As described above, according to the first embodiment, even if the front wall 61 is pressed forward, a forward positional displacement of the front wall 61 can be prevented by the contact of the front surfaces of the projections 67 with the front surfaces of the recesses 32. In this case, since the recesses 32 are provided effectively utilizing the partition walls 23 partitioning between the adjacent cavities 22, the enlargement and complication of the housing 20 can be suppressed. Further, since the projections 67 are fit into the recesses 32 to fill up the recesses 32, parts cut by forming the recesses 32 can be compensated by the projections 67. Furthermore, since the projections 67 do not contact the terminal fittings 50 and the tips of the projections 67 need not be pulled up to a height position where the projections 67 can contact the terminal fittings 50 unlike the retainer or the like, heights (recessed amounts) of the recesses 32 can be suppressed small.

Further, since the projection 67 is in the form of a rectangular column projecting from the end wall 62, the rigidity of the projection 67 can be enhanced.

Further, since the front surfaces of the engaging projections 68 can contact the front surfaces of the engaging recesses 27 when a rearward pull-out force is applied to the terminal fitting 50, the pull-out force can be resisted and the holding force of the locking lance 24 to hold the terminal fitting 50 can also be enhanced.

Furthermore, since the clearances for allowing the deflection of the locking lance 24 are present between the front and rear surfaces of the engaging recesses 27 and the engaging projections 68 in the engaging recesses 27, the terminal fitting 50 can be inserted into the cavity 22 and the locking lance 24 can be deflected and deformed with the engaging projections 68 fit in the engaging recesses 27.

Second Embodiment

Figure 7:
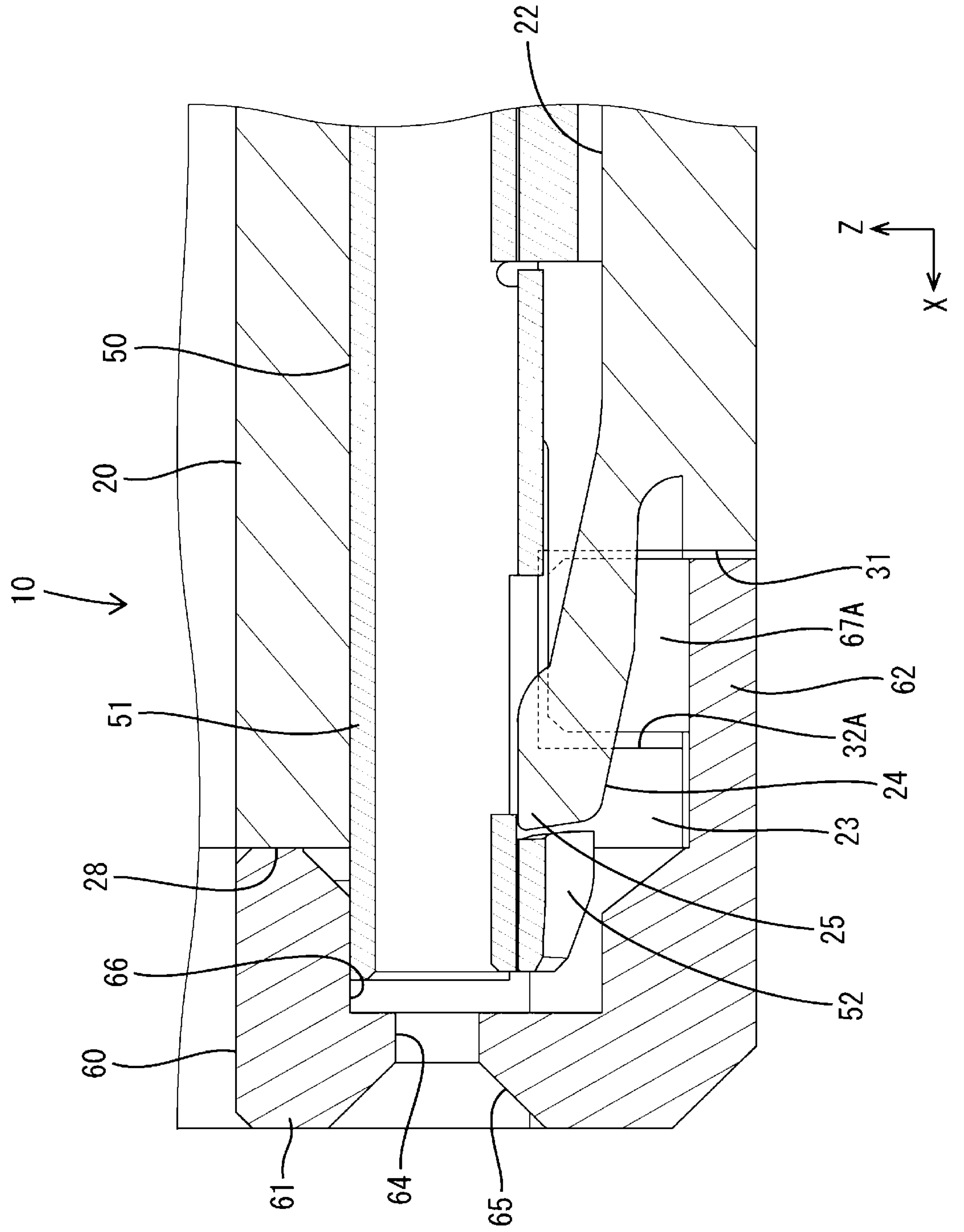
FIG. 7 is a view, corresponding to FIG. 2, of a connector according to a second embodiment.

A second embodiment differs from the first embodiment in the shapes of front surfaces of a projection 67A and a recess 32A as shown in FIG. 7. The front surface of the projection 67A is arranged along the vertical direction, including engaging recesses 27. The front surface of the recess 32A is also arranged along the vertical direction. Although not shown in FIG. 7, the engaging recesses 27 are also arranged along the vertical direction. In the case of the second embodiment, the projection 67A can contact the front surfaces of the recess 32A and the engaging recesses 27 along the vertical direction. The other configuration is the same as in the first embodiment and can achieve effects similar to those of the first embodiment.

Other Embodiments of Present Disclosure

The embodiments disclosed this time should be considered illustrative in all aspects, rather than restrictive.

In the case of the first and second embodiments, the engaging recesses are provided in the both left and right surfaces of the locking lance and the engaging projections to be fit into the engaging recesses are provided on both left and right sides of the projection. In contrast, according to another embodiment, an engaging recess may be provided only in one side surface, out of the left and right surfaces of the locking lance and an engaging projection to be fit into the engaging recess may be provided only on one side part, out of both left and right side parts of the projection. Of course, depending on a situation or the like, the locking lance may not be provided with any engaging recess and the projection may not be provided with any engaging projection.

In the case of the first and second embodiments, one projection is fit into one recess. In contrast, according to another embodiment, one projection may fit into a plurality of recesses.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. An electrical connector, comprising:
- a housing including cavities;
- terminal fittings to be accommodated into the cavities; and
- a front mask including a front wall to be arranged on a front surface side of the housing, wherein:
- a plurality of the cavities extend in a front-rear direction and are arranged side by side in a width direction,
- the housing includes a recess open in one surface in a height direction intersecting the front-rear direction and the width direction in a partition wall partitioning between the cavities adjacent in the width direction,
- the recess is shaped by cutting to penetrate through the partition wall in the width direction, and
- the front mask includes:
  - an end wall projecting from the front wall and to be arranged on one surface side in the height direction of the housing; and
  - a projection projecting from the end wall, to be fit into the recess from a bottom of the housing to fill up the recess and contactably facing a front surface of the recess without contacting the terminal fittings.

2. The electrical connector of claim 1, wherein the projection is in the form of a rectangular column projecting from the end wall.

3. The electrical connector of claim 1, wherein:
- the housing includes deflectable and deformable locking lances projecting into the cavities and configured to lock the terminal fittings,
- the locking lance includes an engaging recess open in at least one side surface, out of side surfaces on both sides in the width direction, and the projection includes an engaging projection projecting from the partition wall, to be fit into the engaging recess and contactably facing a front surface of the engaging recess.

4. The electrical connector of claim 3, wherein clearances for allowing deflection of the locking lance are present between the engaging projection and front and rear surfaces of the engaging recess in the engaging recess.

* * * * *